United States Patent
Hottinen et al.

(10) Patent No.: US 6,353,638 B1
(45) Date of Patent: Mar. 5, 2002

(54) METHOD AND SYSTEM FOR DIGITAL SIGNAL TRANSMISSION

(75) Inventors: Ari Hottinen, Espoo; Jorma Lilleberg, Oulu, both of (FI)

(73) Assignee: Nokia Network Oy, Espoo (FI)

( * ) Notice: Subject to any disclaimer, the term of this patent is extended or adjusted under 35 U.S.C. 154(b) by 0 days.

(21) Appl. No.: 09/514,714

(22) Filed: Feb. 28, 2000

Related U.S. Application Data

(63) Continuation of application No. PCT/FI99/00603, filed on Jul. 7, 1999.

(30) Foreign Application Priority Data

Jul. 8, 1998 (FI) .................................................. 981575

(51) Int. Cl.$^7$ ............................ H04L 27/28; H04B 7/00
(52) U.S. Cl. ........................................ 375/260; 455/524
(58) Field of Search .................................. 375/260, 130, 375/146, 135, 295, 286; 370/331, 320, 319, 335, 347, 342, 503; 455/524, 525, 500, 502

(56) References Cited

U.S. PATENT DOCUMENTS

| | | | |
|---|---|---|---|
| 4,626,803 A | * 12/1986 | Holm | 332/151 |
| 5,101,501 A | 3/1992 | Gilhousen et al. | 455/442 |
| 5,625,876 A | 4/1997 | Gilhousen et al. | 370/331 |
| 5,652,748 A | 7/1997 | Jolma et al. | 370/320 |
| 5,966,377 A | * 10/1999 | Murai | 370/342 |
| 5,978,365 A | 11/1999 | Yi | 370/331 |
| 6,078,817 A | * 6/2000 | Rahman | 455/452 |

FOREIGN PATENT DOCUMENTS

| | | |
|---|---|---|
| EP | 0566 257 A1 | 10/1993 |
| EP | 0566 551 A2 | 10/1993 |
| EP | 0744 841 A2 | 11/1996 |
| WO | WO 95/08901 | 3/1995 |
| WO | WO 97/41670 | 11/1997 |

OTHER PUBLICATIONS

Barbulescu, Sorin Adrian, "Chapter 4—A Diversity Scheme Using Turbo Codes", *Iterative Decoding of Turbo Codes and Other Concatenated Codes*, pp. 80–92, Feb. 1996.
International Search Report for PCT/FI99/00603.
Sklar, Bernard; "A Primer On Turbo Code Concepts", *IEEE Communications Magazine*, Dec. 1997, vol. 35, No. 12, p.94–102.
Viterbi, Andrew J.; , "Forwarding Error Control Coding—Another Means to Exploit Redundancy", *CDMA—Principles of Spread Spectrum Communication*, ISBN 0–201–63374–4, Chapter 5.3, p. 126–140.

* cited by examiner

*Primary Examiner*—Chi Pham
*Assistant Examiner*—Khai Tran
(74) *Attorney, Agent, or Firm*—Altera Law Group, LLC

(57) ABSTRACT

The invention relates to a method and a system for digital signal transmission. In this method, a signal is encoded in order to minimize transmission errors on a transmission channel, and the encoded signal is sent through at least two base stations. A user equipment then receives the encoded signal and the coding of the received signal is decoded. The method is in accordance with the invention characterized in that the encoded signal is divided into separate signal parts having at least partly different contents. Then a specific signal part is indicated for each base station, and the base stations send their specific signal parts. In reception, the information in the received signal parts is combined.

46 Claims, 8 Drawing Sheets

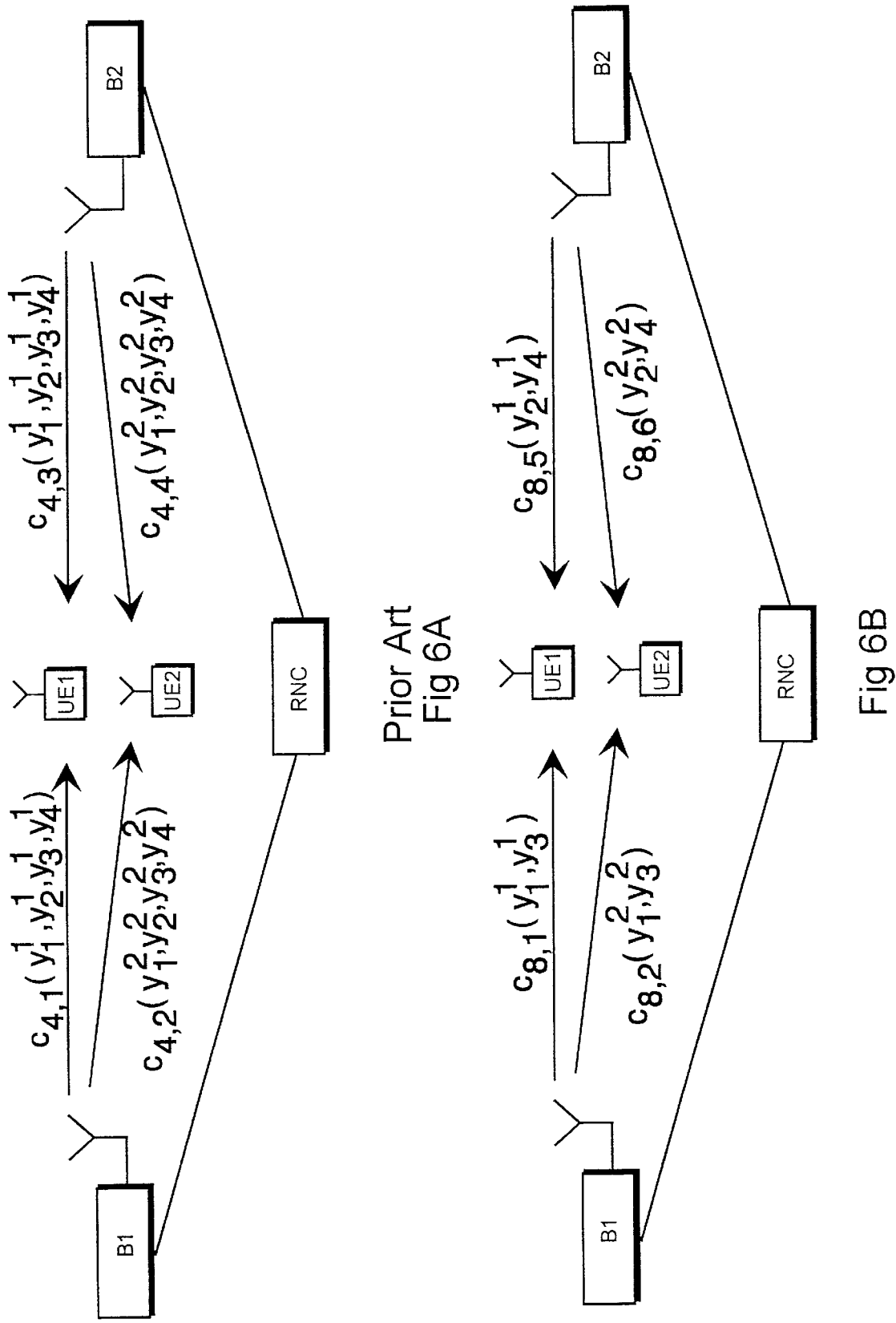

METHOD AND SYSTEM FOR DIGITAL SIGNAL TRANSMISSION

This Application is a continuation of PCT/FI99/00603 filed on Jul. 7, 1999

FIELD OF THE INVENTION

The invention relates to a method and a system for digital signal transmission particularly in mobile telephone systems. More precisely the invention relates to transmitting channel encoded signal using a method like macro diversity.

BACKGROUND OF THE INVENTION

One of the major problems in mobile telephone systems is to efficiently use a limited radio resource and to simultaneously offer good quality for the user of the system. The problem becomes more serious as new systems are created where new services requiring fairly high data transmission rates, for example data transmission, are transmitted in addition to speech.

A solution to the quality problem is to use antenna diversity in transmission. This means that the same signal is sent in a base station to a user equipment using two or more different antennas.

The use of various block and convolutional codes in order to minimize transmission errors is commonly known in the art. Coding refers to a signal that is encoded with a coding method so that errors occurring in the signal on the transmission channel can be detected and even corrected in reception. Known codes include parallel concatenated convolutional codes, or turbo codes. The turbo codes are described in the publication Sklar, Bernard: A Primer on Turbo Code Concepts, in IEEE Communications Magazine, December 1997 Vol 35 No. 12, which is incorporated herein as reference. Another known coding mode is space/time coding described in publication WO 97/41670.

The use of macro diversity is also known to those skilled in the art and is described, for example, in U.S. Pat. No. 5,101,501. The downlink macro diversity refers to at least two different base stations which concurrently send the same encoded signal to the user equipment. Interference and fading in one link cannot prevent the signal from arriving at the user equipment as the signal is sent from two different locations. The received signals are connected in the user equipment and the coding employed is decoded, whereby eventual transmission errors can be corrected. The downlink macro diversity is a compulsory property, for example, in the IS-95 radio system.

A disadvantage with macro diversity is that it uses more of the radio resources in the system than a standard connection establishment mode. For example, when two base stations are used, both base stations employ the capacity of a single transmission channel for transmitting the signal to the user equipment. The transmission channel is formed in various ways in different multiple access methods, for example in systems using TDMA (Time Division Multiple Access) the transmission channel is determined as a combination of frequency and time slot. Correspondingly in systems using CDMA (Code Division Multiple Access) the transmission channel is a spreading code. Different CDMA/TDMA hybrid systems are also possible.

BRIEF DESCRIPTION OF THE INVENTION

It is an object of the invention to provide a method and an apparatus implementing the method so as to solve the above problems. This is achieved with the method described below, the method for digital signal transmission from a radio network subsystem to a user equipment in a mobile telephone system comprising the following steps of: encoding a signal in order to minimize transmission errors on a transmission channel, sending the encoded signal through at least two different base stations, receiving the encoded signal in a user equipment and decoding the received signal coding, dividing the encoded signal into separate signal parts having at least partly different contents, indicating a specific signal part for each base station, the base stations sending their specific signal parts and combining the information of the signal parts received in reception.

The invention also relates to a system for digital signal transmission comprising: a radio network subsystem including a base station controller and at least two base stations, a channel encoder for coding a signal in order to minimize transmission errors on a transmission channel, at least two different base stations for sending the encoded signal, a user equipment for receiving the encoded signal, and a channel decoder for decoding the received signal coding. The system also comprises: a divider dividing the encoded signal into separate signal parts having at least partly different contents, a radio network subsystem being arranged to indicate a specific signal part for each base station, the base stations being arranged to send their specific signal parts and a combiner combining the information in the received signal parts.

The preferred embodiments of the invention are disclosed in the dependent claims.

The invention is based on the fact that the radio resources of the system are not wasted by sending an entire encoded signal using macro diversity, instead only parts of the signal are sent through different base stations. This allows to achieve an equal result compared to standard macro diversity on account of the efficient coding.

Several advantages are achieved with the method and system of the invention. The reliability of the transmission is nearly as good as when using standard macro diversity but less radio resources are needed in the system. The available resources can be distributed if needed to other users or services.

BRIEF DESCRIPTION OF THE DRAWINGS

In the following the invention will be described in connection with the preferred embodiments with reference the accompanying drawings, in which.

DETAILED DESCRIPTION OF THE INVENTION

The invention can be used in mobile telephone systems in which several base stations can be used for sending the same signal. A transmission channel can be formed by using, for example, time division, frequency division or code division multiple access methods. The systems of the invention also include systems using combinations of the different multiple access methods. The examples illustrate the use of the invention in a universal mobile telephone system using a direct sequence wideband code division multiple method without, however, restricting the invention thereto.

Figure 1A:
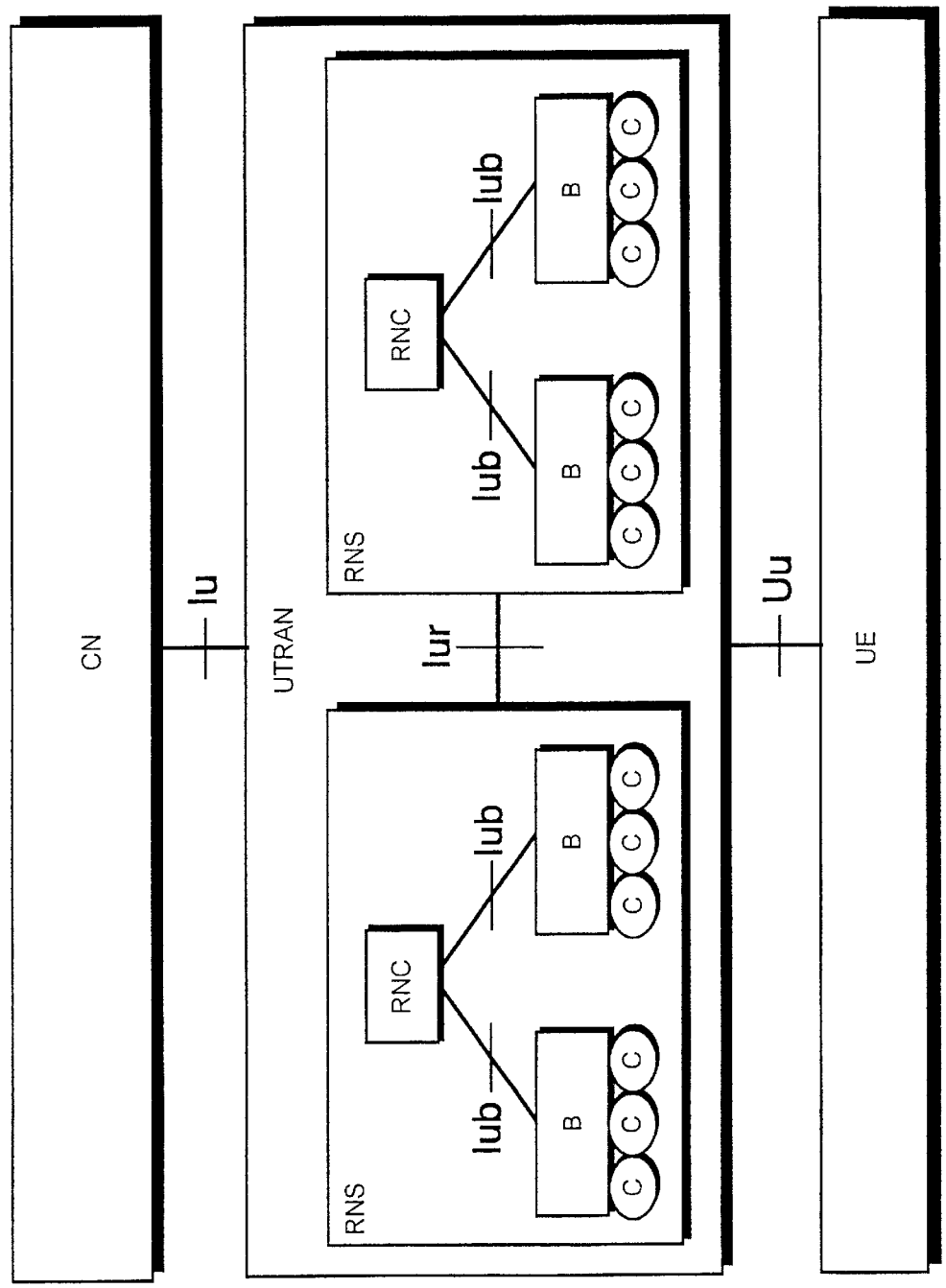
FIGS. 1A and 1B show an example of a system of the invention, FIG. 2A show the operation of a transmitter and a receiver of the invention, FIG. 2B show spreading and modulation to be carried out in the transmitter.
Figure 1B:
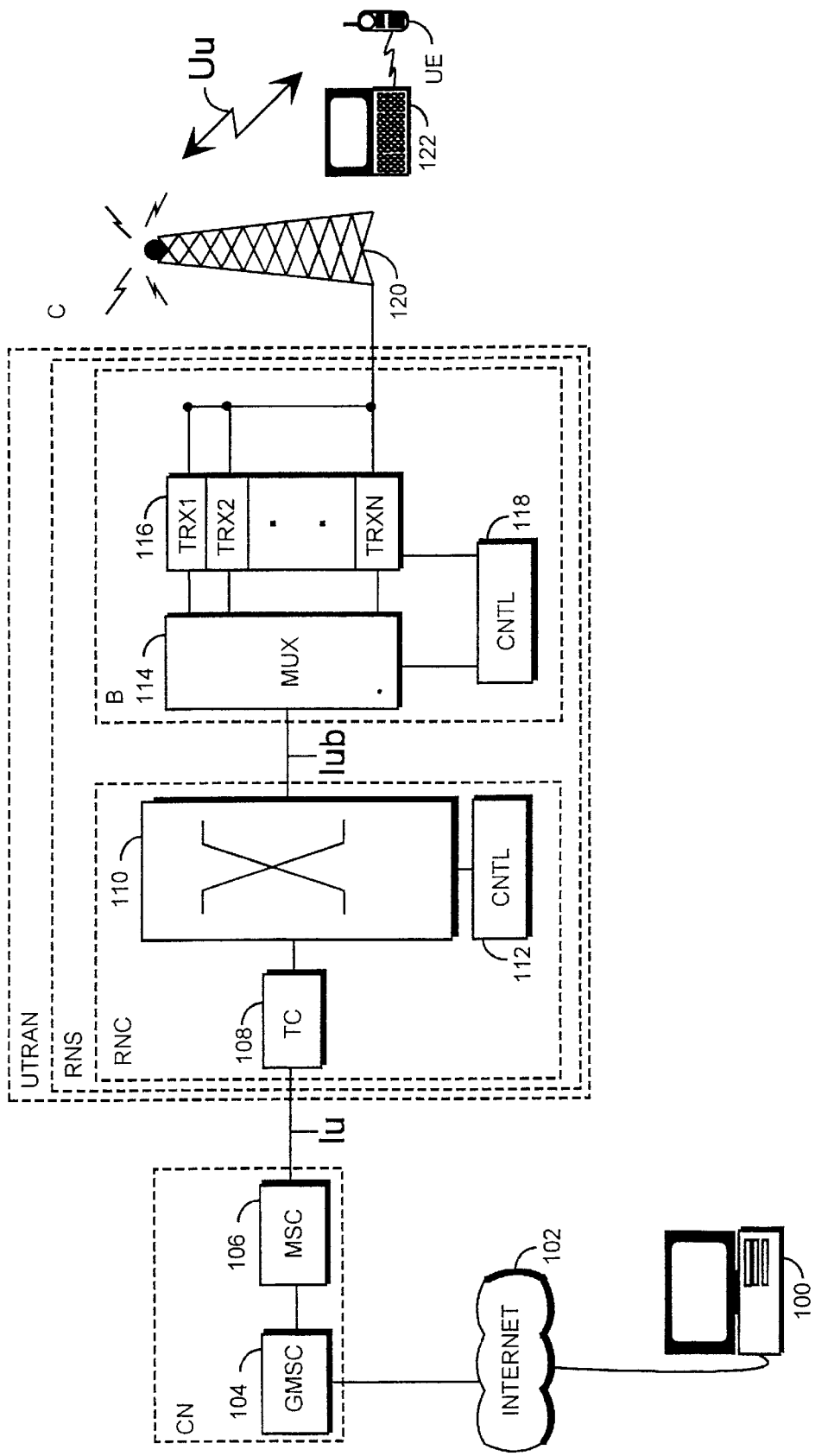

With reference to FIGS. 1A and 1B a universal mobile telephone system structure will be described. FIG. 1B includes only the blocks that are essential for the description of the invention, although it is obvious to those skilled in the art that a common mobile telephone system comprises other functions and structures too, which need not be discussed in greater detail in this context. The main parts of the mobile telephone system are: a core network CN, a universal mobile telephone system (UMTS) terrestrial radio access network UTRAN and a user equipment UE. The interface between the CN and the UTRAN is referred to as Iu, and the air interface between the UTRAN and the UE is referred to as Uu.

The UTRAN is composed of radio network subsystems RNS. The interface between the RNSs is referred to as Iur. The RNS is composed of radio network controllers RNC and of one or more node Bs. The interface between the RNC and the node B is referred to as Iub. The coverage area of the node B, or the cell, is indicated with C in FIG. 1B.

As the presentation in FIG. 1A is very abstract, it is therefore clarified in FIG. 1B by setting forth the parts of the GSM system that approximately correspond with the parts of the UMTS. It should be noted that the mapping shown is by no means a binding one but an approximation, since the responsibilities and functions of the different parts of the UMTS are still being planned.

FIG. 1B illustrates how packet switched transmission is carried out through Internet 102 from a computer 100 connected with the mobile telephone system to a portable computer 122 connected with a user equipment UE. The user equipment UE can, for example, be a fixedly mounted, a vehicle-mounted or a hand-held portable terminal. The infrastructure of the radio network UTRAN is composed of radio network subsystems RNS, i.e. base station subsystems. The radio network subsystem RNS is composed of a radio network controller RNC, or a base station controller, and at least one node B, i.e. a base station, under the control of the RNC.

The base station B comprises a multiplexer 114, transceivers 116, and a control unit 118 which controls the operation of the transceivers 116 and the multiplexer 114. The multiplexer 114 arranges the traffic and control channels used by a plurality of transceivers 116 to a single transmission connection Iub.

The transceivers 116 of the base station B have a connection to an antenna unit 120 which is used for providing a bidirectional radio connection Uu to the user equipment UE. The structure of the frames transmitted in the bi-directional radio connection Uu is determined in detail.

The base station controller RNC comprises a group switching field 110 and a control unit 112. The group switching field 110 is used for switching speech and data and for connecting signalling circuits. The base station B and the base station controller RNC form a base station subsystem which additionally comprises a transcoder 108. The division of functions and the physical structure between the base station controller RNC and the base station B may vary according to the actual implementation. The base station B typically implements the radio connection as described above. The base station controller RNC typically manages the following: radio resource control, inter-cell handover control, power control, timing and synchronization, and paging of user equipment.

The transcoder 108 is usually located as close as possible to a mobile switching center 106 as this allows speech to be transmitted between the transcoder 108 and the base station controller RNC in the mobile telephone system form, thus saving transmission capacity. The transcoder 108 converts different digital speech coding modes used between a public switched telephone network and a radio telephone network to suit one another, for instance from the 64 kbit/s fixed network form to another form (such as 13 kbit/s) of the cellular radio network, and vice versa. The required equipment is not described here in more detail, but it should, however, be noted that the conversion in the transcoder 122 is only carried out for speech, not for other data. The control unit 112 carries out call control, mobility management, collection of statistical data and signalling.

The core network CN is composed of the infrastructure belonging to the mobile telephone system not being part of the UTRAN. FIG. 1B illustrates two equipment of the core network CN, namely a mobile switching center 106 and a gateway mobile switching center 104 handling mobile telephone system connections to the outside world, to the Internet 102 in this example.

Figure 2A:
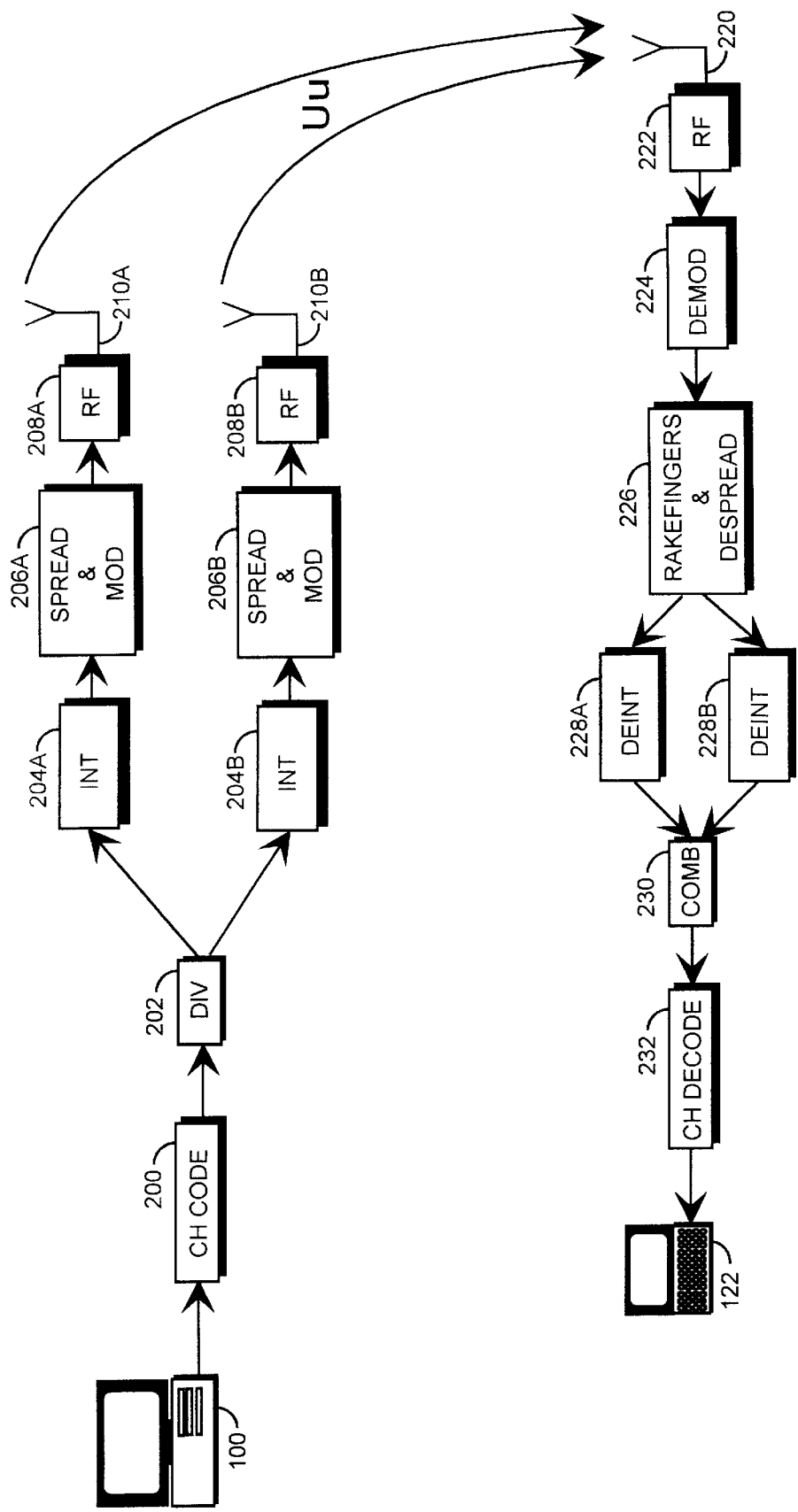

FIG. 2A illustrates the operation of a radio transmitter-radio receiver pair. FIG. 2 describes a downlink case where the radio transmitter is located in the node B and the radio receiver in the user equipment UE.

The upper portion of FIG. 2A illustrates the essential functions of the radio transmitter. Different services placed in a physical channel are, for example, speech, data, moving or still video image, and the control channels of the system that are processed in the control part 214 of the radio transmitter. The Figure only illustrates data processing. Different services require different source encoding equipment, for example speech requires a speech codec. However source encoding equipment is not presented for the sake of clarity in FIG. 2A.

The packets from the computer 100 arrive as described in FIG. 1B at the radio network subsystem RNS where channel coding is carried out in a channel encoder 200. A typical way of performing channel coding is convolutional coding and the different variations thereof, for example turbo coding. Another form of channel coding is different block codes, one example of which is cyclic redundancy check, or CRC. A divider 202 divides a channel encoded signal into separate signal parts having at least partly different contents. This means that the channel encoded signal is not entirely doubled, as in standard macro diversity, since then the advantages of the invention would not be achieved. It is in accordance with the spirit of the invention that both signal parts may partly include same parts of the signal. Such a dissimilarity of signal parts depends on the requirements of the employed channel coding.

Preferably the dissimilarity of the signal parts is carried out by puncturing the signal, for example in such a manner that every other signal symbol is punctured at a first base station and every other symbol at a second base station. When using, for example ½ convolutional coding, two symbols represent each bit. Puncturing can be carried out, for example, in such a manner that every other symbol is removed, or punctured, from one tap. A ⅔ code is thus obtained, since only three symbols represent each two bits. At this coding level the signal parts have partly the same contents.

Puncturing can also be carried out at different coding levels, for example as shown above, where every other symbol of the convolutional code is punctured at the first base station and every other in the second base station. Thus a ½ coding level is obtained where the signal parts to be transmitted through each base station have completely different contents. When using said coding level the same amount of channel resources, for example coding resources, is employed as in hard hand-off, in which the signal to be transmitted through the first base station is changed to be transmitted through a second base station constantly using only a single connection. Other users or services can be provided with the released channel resource of the base station.

The coding mode described is a kind of dynamic puncturing. Puncturing is not used at all in conventional macro diversity. In the method of the invention puncturing can be dynamically changed, for example, according to the audibility of the base station in such a manner that the signal of the best audible base station can be least punctured, and the signal to be transmitted through a less audible base station or base stations is punctured more. The punctured signals can, if desired, be replaced with symbols of another user or service. The service may include information intended for the same user and requiring a different coding. The user can thus, for example, transfer speech by employing the method of the invention and the released data transmission resource can be utilized, for example, for simultaneously sending a telefax and speech to the same user.

Additional information on convolutional coding and puncturing can be obtained from the book Viterbi, Andrew J: CDMA—Principles of Spread Spectrum Communication, ISBN 0-201-633744, chapter 5.3 "Forward Error Control Coding—Another Means to Exploit Redundancy".

Each signal part is then interleaved in an interleaver 204A, 204B. The object of interleaving is to make error correction easier. In interleaving, the bits are mixed with each other in a predetermined way, so that a transitory fading in the radio path does not necessarily make the transferred information unidentifiable. Then the interleaved bits are spread with a spreading code, scrambled with a scrambling code and modulated in blocks 206A, 206B, the operation of which is described in more detail in FIG. 2B.

Finally the combined signal is conveyed to radio frequency parts 208A, 208B, which may comprise power amplifiers and bandwidth restricting filters. Analog radio signal is then transmitted through an antenna 210A, 210B to the radio path Uu.

The lower portion of FIG. 2A illustrates the essential functions of a radio receiver. The radio receiver is typically a RAKE receiver. The analog radio frequency signal is received from the radio path Uu by an antenna 220. The signal is conveyed to radio frequency parts 222 comprising a filter that blocks frequencies outside the desired frequency band. The signal is then converted in a demodulator 224 to an intermediate frequency or directly to a baseband, in which form the signal is sampled and quantized.

As the signal in question is a multipath propagated signal, efforts are made to combine the signal components spread by the spreading code and propagated along different paths in block 226 into one signal for each used spreading code comprising in accordance with prior art several RAKE fingers. The signal components received by different delays of the RAKE fingers are searched by correlating the received signal with the used spreading code delayed with predetermined delays. After the signal component delays have been found, the signal components belonging to the same signal are combined. The spreading code of the signal components is despread at the same time by multiplying the signal by a specific spreading code of the physical channel. Interleaving of the obtained physical channel is then de-interleaved in de-interleaving means 228A, 228B for each signal part.

Then the de-interleaved signal parts are combined in a combiner 230 into a single signal, for example by de-puncturing the signal puncturing. After that the signal is conveyed to a channel decoder 232, wherein the channel coding used in the transmission, such as block coding or convolutional coding, is decoded. Convolutional coding is preferably decoded with a Viterbi decoder. The originally sent and thus obtained data is conveyed to the computer 122 connected to the user equipment UE for further processing.

The divider 202 can be located in the base station controller RNC or in the base station B. The advantage of the divider being located in the base station controller RNC is that only one channel coder 200 is needed. Another advantage is that the used division mode, for example a puncturing pattern, does not have to be signalled from the base station controller RNC to the base station B. The need for data transmission capacity between the base station controller RNC and the base station B is therefore smaller. When the divider 202 is located in the base station the advantage is that the signal does not necessarily have to be divided into parts and encoded in base station controller RNC. The same signal only need to be directed to both base stations B where the signal is coded and divided.

The invention is preferably implemented by software, in which case the functions of the divider 202 and the combiner 230 are aimed at digital signal processing, preferably implemented with a signal processing processor or a general processor including software. Naturally the software of the control parts controlling the function of the base station controller RNC, the base station B and the user equipment UE also need changes.

The method of the invention can be used, for example, in such a manner that in a situation in which the user equipment UE can accurately hear only one base station B, i.e. the link gain of two base stations B deviate a lot, then only one base station B is used for implementing the connection. If the user equipment UE can accurately hear two base stations B when moving in the border area between cells, in which case the link gain of two base stations B is approximately equal, then standard macro diversity or the method of the invention can be used. In standard macro diversity the same signal is transmitted through two different base stations B to the user equipment UE, but in the method of the invention the parts of the signal having at least partly different contents are transmitted through two different base stations B to the user equipment UE.

The gain of the base station B is measured in such a manner that the user equipment UE measures a pilot signal of a neighboring base station B and indicates the measurement results to the base station B which possibly conveys them to the base station controller RNC. The base station controller RNC, the base station B and the user equipment UE decide together or separately about the connection mode and coding level to be used.

The method can thus be dynamically used. One way to carry out the dynamic use is to agree upon said connection modes to be used in the beginning of the connection. During the connection, the connection mode can be changed depending on the situation, for example from the standard connection through macro diversity to the method of the invention. However, the use of macro diversity is not necessary but optional. In some situations, for example, when the user equipment UE is a Wireless Local Loop (WLL) terminal, in which case the connection of the user equipment UE is implemented through the radio path, but the mobility thereof is restricted, and when the user equipment UE is located in the border area between two base stations B, it is possible to use only the method of the invention for implementing the connection.

Typically the base station controller RNC tells which connection mode to employ for each connection, since the base station controller RNC is aware of the total capacity and the available capacity of the base stations B within its area. The decision can also be made in the user equipment UE.

A reason for employing the method of the invention can also be that the resources run out, in which case the connections using macro diversity can be changed to connections using the method of the invention, and thus release system resources.

Figure 2B:
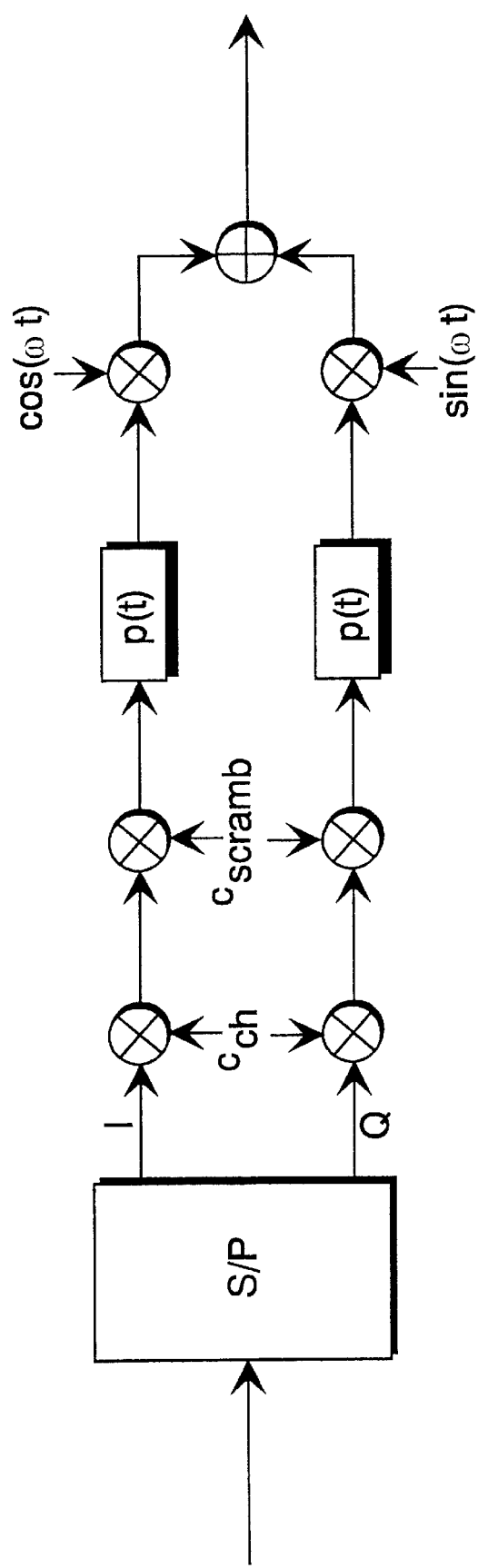

FIG. 2B illustrates in more detail spreading of the channel with the spreading code and modulation thereof. In the Figure a bit stream of the channel arrives from left into a block S/P, wherein serial to parallel conversion is carried out for each two bit sequence, i.e. one bit is conveyed into the I branch of the signal and the other bit is conveyed into the Q branch of the signal. Then the I and Q branches of the signal are multiplied with the same spreading code $c_{ch}$, whereby relatively narrow-band information is spread into a wide frequency band. Each radio connection Uu has a specific spreading code by which the receiver recognizes the transmissions meant for itself. Then the signal is scrambled by multiplying it with a scrambling code $c_{scramb}$ which is different for each transmitter. The pulse form of the produced signal is filtered with a filter p(t). Finally the signal is modulated into a radio frequency carrier by multiplying the different branches thereof with a carrier. There is a 90 degree phase shift between the carriers. The branches are then combined into one carrier which is ready to be sent to the radio path Uu, excluding possible filtrations and power amplifications. The described modulation is QPSK (Quadrature Phase Shift Keying).

Figure 5:
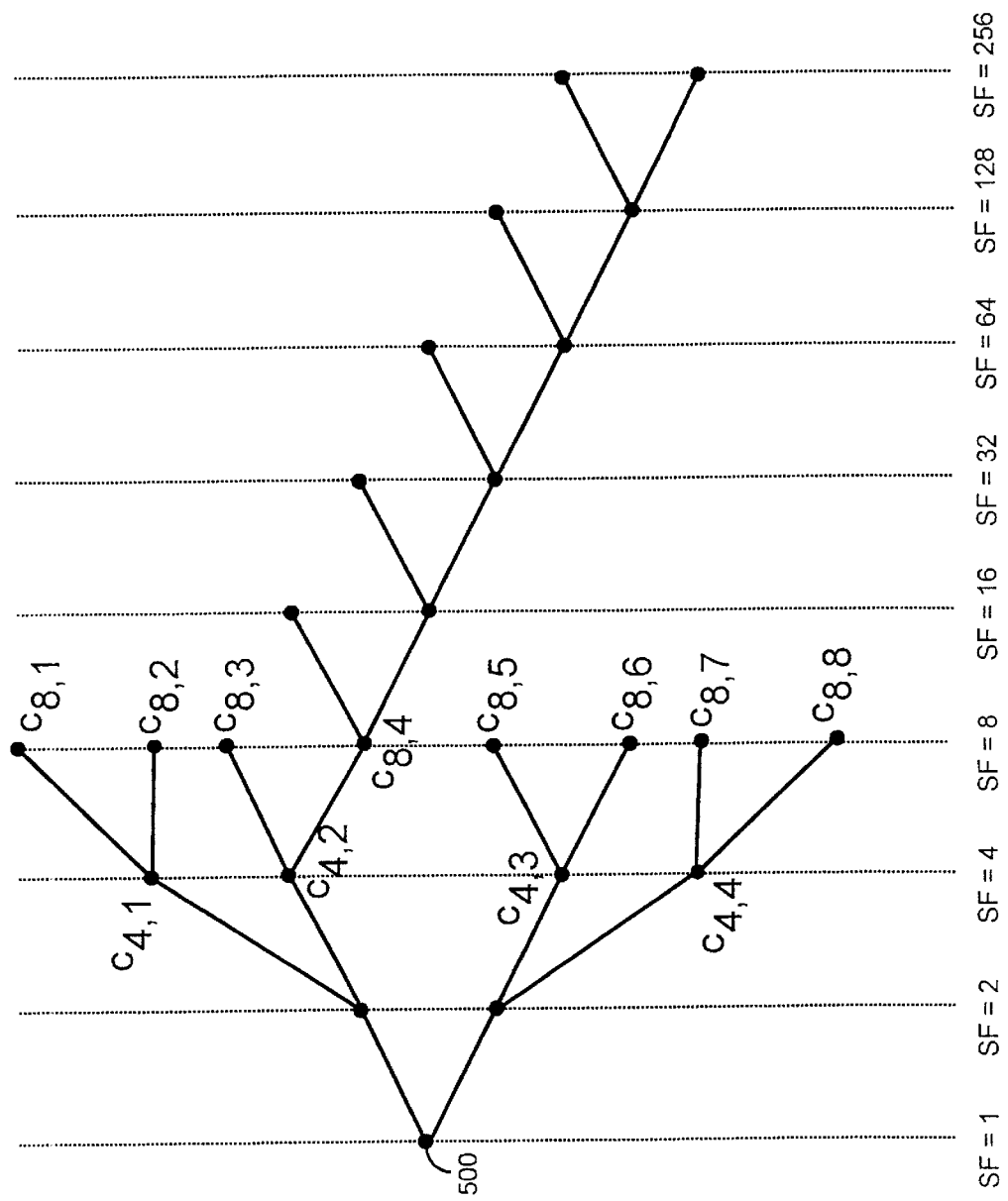

FIG. 5 illustrates examples of different spreading codes. Each dot 500 represents one possible spreading code. The vertical broken lines represent different spreading factors (SF) SF=1, SF=2, SF=4, SF=8, SF=16, SF=32, SF=64, SF=128, SF=256. The codes located on each vertical broken line are mutually orthogonal. Thus, the maximum number of mutually orthogonal spreading codes that can be used simultaneously is two hundred fifty-six. For example in the UMTS, when a 4.096 megachip carrier is used, the spreading factor SF=256 corresponds to a transmission rate of about 32 kilo-bits/second. Correspondingly, the highest usable transmission rate of 2048 kbit/s is achieved with the spreading factor SF=4. The transmission rate on the channel thus varies stepwise between 32, 64, 128, 256, 512, 1024 and 2048 kbit/s, and the spreading factor correspondingly changes between 256, 128, 64, 32, 16, 8 and 4. The transmission rate that the user obtains depends on the used channel coding. For example, when using ⅓ convolutional coding the transmission rate of the user is about one third of the actual transmission rate of the channel. The spreading factor indicates the length of the spreading code. The spreading code (1) corresponds for instance with the spreading factor SF=1. The spreading factor SF=2 has two mutually orthogonal spreading codes (1,1) and (1,−1). The spreading factor SF=4 has four mutually orthogonal spreading codes: the spreading codes (1,1,1,1) and (1,1,−1,−1) below the upper level spreading code (1,1), and the spreading codes (1,−1,1,−1) and (1,−1,−1,1) below the other upper level spreading code (1,−1). The formulation of the spreading codes thus continues while proceeding towards the lower levels of the code tree. The spreading codes at a certain level are always mutually orthogonal. A spreading code of a certain level is likewise orthogonal with all the following spreading codes derived from another spreading code of the same level.

Figure 4:
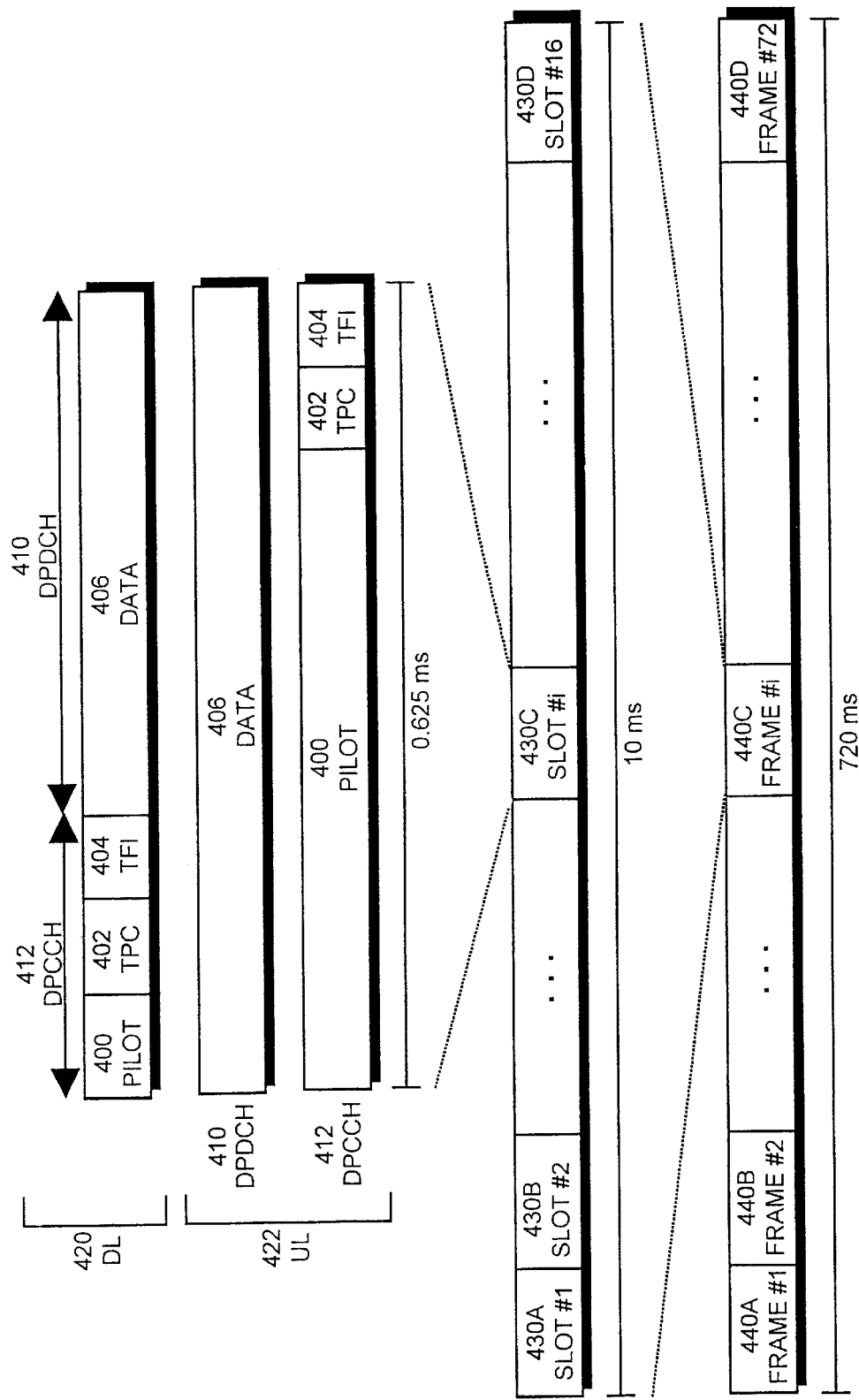
FIG. 4 shows mobile telephone system channels placed in a frame, FIG. 5 show a spreading code tree, FIG. 6A show prior art macro diversity, and FIG. 6B show a system of the invention.

FIG. 4 shows an example of a frame structure that can be used in the physical channel. Frames 440A, 440B, 440C, 440D are consecutively numbered from one to seventy-two, and they form a 720 millisecond long super frame. The length of one frame 440C is ten milliseconds. The frame 440C is divided into sixteen slots 430A, 430B, 330C, 330D, the length of one slot 330C being 0.625 milliseconds. One slot 430C typically corresponds with one power control period during which power is adjusted for instance one decibel up or down.

The physical channels are divided into two different types: dedicated physical data channels (DPDCH) 410 and dedicated physical control channels (DPCCH) 412. The DPDCHs 410 are used to carry data 406 generated in and above layer two of the OSI (Open Systems Interconnection) model, i.e. dedicated control channels and dedicated traffic channels. DPCCHs 412 carry the control information generated in layer one of the OSI model. The control information comprises: pilot bits 400 used in channel estimation, transmit power-control commands (TPC) 402, and optionally a transport format indicator (TFI) 404. The TFI 404 tells the receiver the current transmission rate for each uplink DPDCH.

As shown in FIG. 4, the downlink DPDCHs 410 and DPCCHs 412 are time multiplexed into the same slot 430C. Conversely, in the uplink, the channels are sent in parallel so that they are IQ/code multiplexed (I=in-phase, Q=quadrature) into each frame 440C and sent using dual-channel quadrature phase-shift keying modulation. When additional DPDCHs 410 are to be sent, they are code multiplexed into the I or Q branch of the first channel pair.

Figure 3:
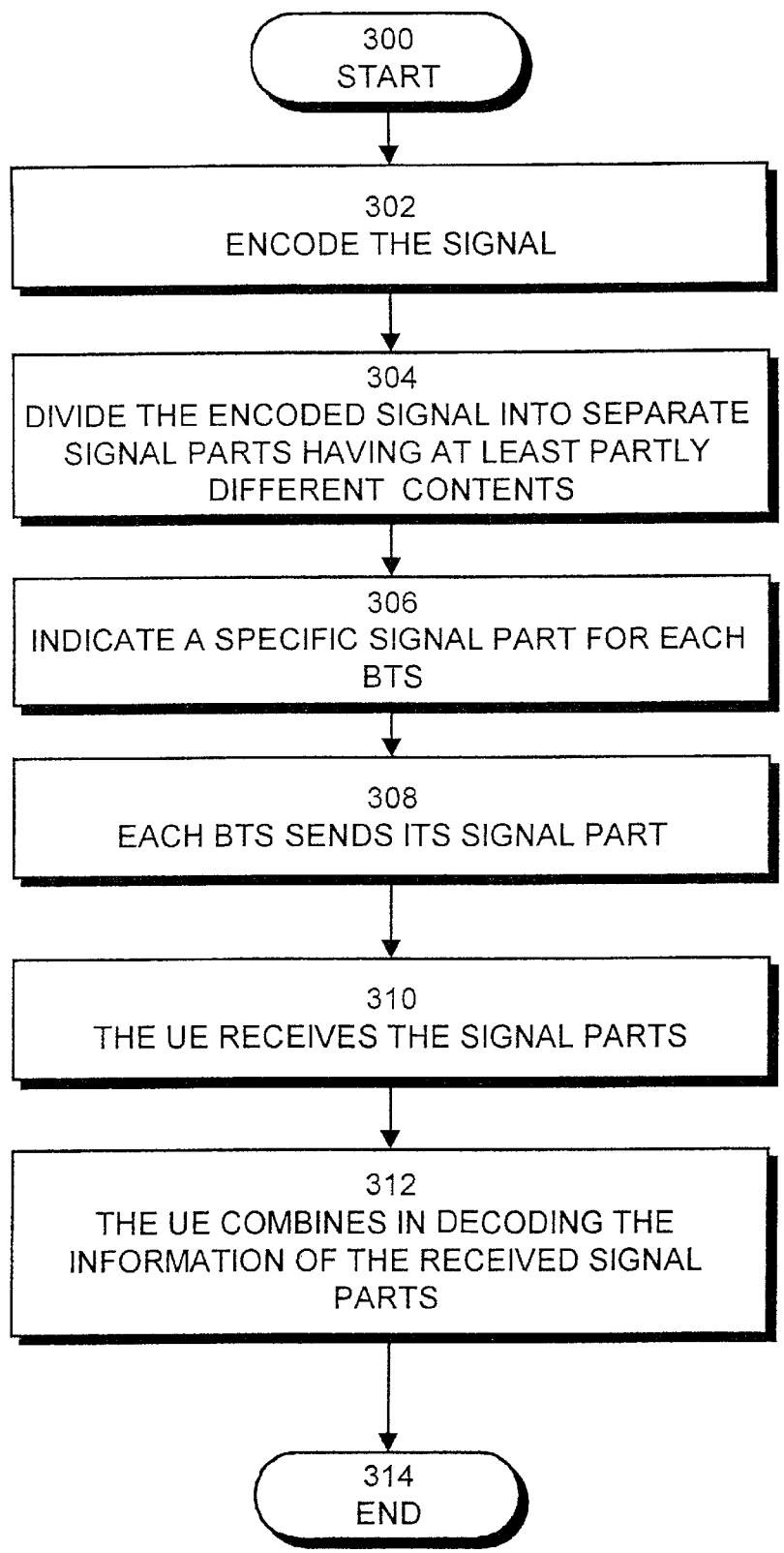
FIG. 3 is a flow chart showing a method of the invention.

Let us now take a closer look at FIG. 3 in which the steps of the invention are shown in the flow chart:

300: Start the process.

302: Encode the signal in order to minimize transmission errors on the transmission channel.

304: Divide the encoded signal into separate signal parts having at least partly different contents.

306: Indicate a specific signal part for each base station.

308: Send the encoded signal through at least two different base stations so that the base stations send their specific signal parts.

310: User equipment receives the encoded signal. The user equipment can distinguish the signal parts sent through different base stations from one another.

312: Combine the information of the received signal parts.

314: End the process.

The coding used can be any appropriate coding method, such as block coding, convolutional coding, space/time coding, or parallel concatenated convolutional coding, i.e. turbo coding, described in the above reference. When space/time coding is used the code components can be optimized onto a transmission channel.

In accordance with the method half of the standard transmission channel capacity used for signal transmission in both base stations is left unused if there are two base stations. Correspondingly when three base stations are used two thirds of the capacity is left unused etc. In a preferred embodiment the unused transmission channel capacity is utilized in such a manner that the base station sends the signal parts intended to at least two different user equipment by using a single transmission channel so that the transmission channel is divided into orthogonal or quasi-orthogonal channel parts, and the signal part is located in a channel part. For example, if the transmission channel is a ten milliseconds long frame, then during the first half of the frame the first base station sends the first signal part to the first user equipment, and during the second half of the frame the first base station sends the first signal part to the second user equipment. Then another base station sends during the second half of the frame the second signal part to the first user equipment etc. The division into channel parts can also be conducted in other ways, for example as described below by using spreading codes or frequency resources.

In a preferred embodiment the signal parts sent through each base station are timed in such a manner that the user equipment receives them substantially within the duration of one frame. This alleviates the assembly of the signal parts in the user equipment.

The way by which the information to be transmitted is divided between transmission channels may vary. The variation can be made, for example, pseudo-random in accordance with a sequence commonly known by the user equipment and the base station.

In a preferred embodiment the user equipment measures the received powers of base stations audible to it, on the basis of which the base stations to be used are decided.

The power control can be solved so that the user equipment performs a mutual power control for the base stations, or that the user equipment performs a separate power control for each base station. The mutual power control reduces the need for signalling, but then again a separate power control improves the performance of the method. The power control is generally carried out using a closed loop. The user equipment then estimates the power of the signal received from the base station, and sends a power control command to the base station, in accordance with which the base station adjusts its transmission power. The power control command is generally conveyed by a power control bit in the radio frame.

FIG. 6A illustrates how macro diversity is carried out in a CDMA radio system in accordance with prior art. In FIG. 6A the letter c depicts the spreading code, with reference to the spreading code tree shown in FIG. 5. As shown in FIG. 5 the spreading codes can be referred to with an index, in which the first number indicates the spreading factor, and the second number indicates the consecutive number of said code at said spreading factor level. For example, the spreading code $c_{4,1}$ refers to the first spreading code at the spreading factor SF=4 level. The transmitted, modulated and channel encoded signal is depicted in FIG. 6A by the term $y_K$. Since there are two user equipment UE1 and UE2, superscripts are employed. Superscript 1 refers to the signal to be sent to the first user equipment UE1 and superscript 2 refers to the signal to be sent to the second user equipment UE2. Bit streams are carried from the base station controller RNC to two separate base stations B1 and B2. The bit streams are encoded in both base stations B1, B2. The coding can naturally also be performed in the base station controller RNC. The complete encoded bit streams are sent to the user equipment UE1, UE2. The first user equipment UE1 receives the signals $c_{4,1}(y_1^1, y_2^1, y_3^1, y_4^1)$ and $c_{4,3}(y_1^1, y_2^1, y_3^1, y_4^1)$ spread to the same frequency band by two different spreading codes $c_{4,1}$ and $c_{4,3}$. The second user equipment UE2 receives the signals $C_{4,2}(y_1^2, y_2^2, y_3^2, y_4^2)$ and $c_{4,4}(y_1^2, y_2^2, y_3^2, y_4^2)$ spread into the same frequency band by two different spreading codes $c_{4,2}$ and $c_{4,4}$. The spreading codes used within a base station are selected from the same code tree, i.e. they are mutually orthogonal. Different base stations can use the same code tree, and each transmitter has a specific scrambling code, which is why the spreading codes between different base stations are not orthogonal. When macro diversity is used, two user equipment need, for example four different transmission channels, or here four different spreading codes.

FIG. 6B illustrates an example corresponding with the one in FIG. 6A implemented in accordance with the invention. Bit streams are again carried from the base station controller RNC to the base stations B1, B2. The coding can be performed in the base station controller RNC or in the base stations B1, B2. When coding is performed in the base station controller RNC the number of encoders needed can be reduced: instead of two encoders only one is needed. In accordance with the invention the encoded bit streams are not completely sent, only a particular part having at least partly different contents is sent through both base stations B1, B2. The first user equipment UE1 receives the signals $c_{8,1}(y_1^1, y_3^1)$ and $c_{8,5}(y_2^1, y_4^1)$ spread into the same frequency band by two spreading codes $c_{8,1}$ and $c_{8,5}$, i.e. at the spreading factor level SF=8, which is one spreading factor level below the level shown in the example of FIG. 6A. The second user equipment UE2 now uses the capacity left unused by the first user equipment UE1 on the transmission channels, i.e. the two free codes of the spreading factor level SF=8, or codes $c_{8,2}$ and $c_{8,6}$, by which signals $c_{8,1}(y_1^1, y_3^1)$ and $c_{8,5}(y_2^1, y_4^1)$ are spread. Now the two user equipment only need four spreading codes of the spreading factor SF=8 level instead of four spreading codes of the spreading factor SF=4 level. The codes used within the base station are mutually orthogonal, i.e. the codes $c_{8,1}$ and $c_{8,2}$, as well as the codes $c_{8,5}$ and $c_{8,6}$ are mutually orthogonal. How to divide the channel resources in the system has been agreed upon in advance, or is signalled to the user equipment UE1, UE2.

Even though the invention is described above with reference to an example shown in the attached drawings, it is apparent that the invention is not restricted thereto, but can vary in many ways within the inventive idea disclosed in the attached claims.

What is claimed is:

1. A method for digital signal transmission from a radio network subsystem to a user equipment in a mobile telephone system comprising:

encoding a signal in order to minimize transmission errors on a transmission channel, sending the encoded signal through at least two different base stations (B), receiving the encoded signal in the user equipment (UE), decoding the received signal coding, dividing the encoded signal into separate signal parts, each of the separate signal parts including a predetermined part of the encoded signal, indicating which of the separate signal parts is associated with each base station (B), each base station sending the base station's separate signal part, and combining information of the separate signal parts received in reception.

2. The method as claimed in claim 1, wherein the division of the encoded signal into separate signal parts having at least partly different contents is carried out by puncturing the encoded signal differently for each base station (B) used in transmission.

3. The method as claimed in claim 2, wherein the punctured encoded symbol is replaced with a symbol of another user or service.

4. The method as claimed in claim 2, wherein the puncturing between different base stations (B) is carried out in relation to audibility of the base station (B) to the user equipment (UE).

5. The method as claimed in claim 1, wherein each base station (B) sends the base station's separate signal part orthogonally or quasi-orthogonally in relation to the other signals sent thereby.

6. The method as claimed in claim 1, wherein the base station (B) employs a time division, frequency division or code division multiple access method, or a combination of various multiple access methods.

7. The method as claimed in claim 1, wherein the user equipment (UE) can distinguish the separate signal parts sent through different base stations (B) from one another.

8. The method as claimed in claim 1, wherein a channel resource that is released while using the method is given to another user or service.

9. The method as claimed in claim 8, wherein each base station (B) sends the base station's separate signal part intended to at least two different user equipment (UE) using a transmission channel in such a manner that the transmission channel is divided into channel parts, and the separate signal part intended for each user equipment (UE) is placed into each channel part.

10. The method as claimed in claim 9, wherein the transmission channel is implemented using spreading codes, and the spreading codes are arranged to a code tree in such a manner that a first level or a code tree root comprises a one bit spreading code, a second level comprises two branches with mutually orthogonal two bit spreading codes, a third level comprises four branches with mutually orthogonal four bit spreading codes, a fourth level comprises eight branches with mutually orthogonal eight bit spreading codes, and when proceeding downwards in the code tree a number and length of the spreading codes are always doubled from the previous level, and the transmission channel is divided into two channel parts when moving from an upper level spreading code to two lower level spreading codes.

11. The method as claimed in claim 1, wherein a transition to or from the method dynamically takes place from one normally used radio connection (Uu) or from two radio connections (Uu) using macro diversity.

12. The method as claimed in claim 11, wherein the radio network subsystem (RNS) and/or the user equipment (UE) decide whether to use the method.

13. The method as claimed in claim 11, wherein the transition to or from the method takes place on the basis of reception power measurements of neighboring base stations conducted by the user equipment (UE).

14. The method as claimed in claim 11, wherein the transition to or from the method takes place on the basis of the availability of radio resources.

15. The method as claimed in claim 1, wherein the user equipment (UE) measures reception powers of the base stations (B) audible to the user equipment, on the basis of which a decision is made on how the signal is divided into signal parts between each base station (B).

16. The method as claimed in claim 1, wherein the user equipment (UE) performs power control mutually for the base stations (B).

17. The method as claimed in claim 1, wherein the user equipment (UE) performs power control separately for each base station (B).

18. The method as claimed in claim 1, wherein the separate signal parts to be sent through each base station (B) are timed in such a manner that the user equipment (UE) receives them substantially within the duration of one frame.

19. The method as claimed in claim 1, wherein the signal coding is block coding.

20. The method as claimed in claim 1, wherein the signal coding is convolutional coding.

21. The method as claimed in claim 1, wherein the signal coding is parallel concatenated convolutional coding.

22. The method as claimed in claim 1, wherein the signal coding is space/time coding.

23. The method as claimed in claim 22, wherein components of the signal coding are optimized onto the transmission channel.

24. A system for digital signal transmission, comprising
a radio network subsystem (RNS) including a base station controller (RNC) and at least two base stations (B),
a channel encoder for coding a signal in order to minimize transmission errors on a transmission channel,
said at least two different base station (B) for sending the encoded signal,
a user equipment (UE) for receiving the encoded signal,
a channel decoder for decoding the received signal coding,
a divider dividing the encoded signal into separate signal parts, each of the separate signal parts including a predetermined part of the encoded signal,
a radio network subsystem being arranged to indicate which of the separate signal parts are associated with each base station (B), wherein
the base stations (B) being arranged to send each base station's separate signal part, and
a combiner combining information in the received separate signal parts.

25. The system as claimed in claim 24, wherein the divider is arranged to divide the encoded signal into separate signal parts having at least partly different contents by puncturing the encoded signal differently for each base station (B) to be used in transmission.

26. The system as claimed in claim 25, wherein the radio network subsystem (RNS) is arranged to replace a punctured symbol with another user or service symbol.

27. The system as claimed in claim 25, wherein the radio network subsystem (RNS) is arranged to conduct puncturing between different base stations (B) in relation to audibility of the base station (B) to the user equipment (UE).

28. The system as claimed in claim 24, wherein the base station (B) is arranged to send each base station's separate signal part orthogonally or quasi-orthogonally in relation to the other signals sent thereby.

29. The system as claimed in claim 24, wherein the base station (B) is arranged to use a time division, frequency division or code division multiple access method, or a combination of various multiple access methods.

30. The system as claimed in claim 24, wherein the user equipment (UE) can distinguish the separate signal parts sent through different base stations (B) from each other.

31. The system as claimed in claim 24, wherein the radio network subsystem (RNS) is arranged to provide another user or service with a channel resource released in the division.

32. The system as claimed in claim 31, wherein each base station (B) sends each base station's separate signal part intended to at least two different user equipment (UE) using a transmission channel in such a manner that the transmission channel is divided into channel parts, and to place the signal part intended for each user equipment (UE) into each channel part.

33. The system as claimed in claim 32, wherein the transmission channel in the system is arranged to be implemented with a spreading code, and spreading codes are arranged to a code tree in such a manner that a first level or a code tree root comprises a one bit spreading code, a second level comprises two branches with mutually orthogonal two bit spreading codes, a third level comprises four branches with mutually orthogonal four bit spreading codes, a fourth level comprises eight branches with mutually orthogonal eight bit spreading codes, and when proceeding downwards in the code tree a number and length of the spreading codes are always doubled from the previous level, and the transmission channel is arranged to be divided into two channel parts by moving in the code tree from an upper level spreading code to two lower level spreading codes.

34. The system as claimed in claim 24, wherein the system is arranged to dynamically shift to use the separate signal parts sent through the at least two base stations and having the at least partly different contents from one normal radio connection (Uu) or two radio connections (Uu) using macro diversity, or to dynamically shift from using signal parts having different contents to use one normal radio connection (Uu) or two radio connections (Uu) using macro diversity.

35. The system as claimed in claim 34, wherein the radio network subsystem (RNS) and/or the user equipment (UE) are arranged to make the decisions concerning the shift.

36. The system as claimed in claim 34, wherein the decisions concerning the shift are arranged to be made on the basis of reception power measurements of neighbouring base stations (B) performed by the user equipment (UE).

37. The system as claimed in claim 34, wherein decisions concerning the shift are arranged to be made on the basis of availability of radio resources.

38. The system as claimed in claim 24, wherein the user equipment (UE) is arranged to measure reception powers of the base stations audible to the user equipment, on the basis of which the radio network subsystem (RNS) and/or user equipment (UE) are arranged to decide how the signal is divided into signal parts between the different base stations (B).

39. The system as claimed in claim 24, wherein the user equipment (UE) is arranged to perform power control mutually for each base stations (B).

40. The system as claimed in claim 24, wherein the user equipment (UE) is arranged to perform power control separately for each base station (B).

41. The system as claimed in claim 24, wherein the radio network subsystem (RNS) is arranged to time the signal parts to be sent through each base station (B) in such a manner that the user equipment (UE) receives them substantially within the duration of one frame.

42. The system as claimed in claim 24, wherein the channel encoder and the channel decoder are arranged to use block coding.

43. The system as claimed in claim 24, wherein the channel encoder and the channel decoder are arranged to use convolutional coding.

44. The system as claimed in claim 24, wherein the channel encoder and the channel decoder are arranged to use parallel concatenated convolutional coding.

45. The system as claimed in claim 24, wherein the channel encoder and the channel decoder are arranged to use space/time coding.

46. The system as claimed in claim 45, wherein the channel encoder is arranged to optimize the signal coding components onto the transmission channel.

* * * * *

UNITED STATES PATENT AND TRADEMARK OFFICE
CERTIFICATE OF CORRECTION

PATENT NO. : 6,353,638 B1  Page 1 of 1
DATED : March 5, 2002
INVENTOR(S) : Hottinen, et al.

It is certified that error appears in the above-identified patent and that said Letters Patent is hereby corrected as shown below:

<u>Title page,</u>
Item [73], Assignee, please replace "Nokia Network Oy" with
-- Nokia Networks Oy --

Signed and Sealed this

Twenty-fifth Day of June, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,353,638 B2
DATED : March 18, 2003
INVENTOR(S) : Stephen P. McGrew It is certified that error appears in the above-identified patent and that said Letters Patent is hereby corrected as shown below:

Column 4,
Line 56, "one illuminated, spot" should read -- one illuminated spot --

Column 8,
Line 12, "training set of images" should read -- training set of images. --

Column 11,
Line 64, "thorough" should read -- through --

Column 12,
Line 4 and 12, "thorough" should read -- through --
Line 31, "includes a an artificial" should read -- includes an artificial --

Signed and Sealed this

Thirtieth Day of December, 2003

JAMES E. ROGAN
*Director of the United States Patent and Trademark Office*